June 21, 1927.
F. M. INGRAM
1,633,020
COW HOPPLE
Filed June 7, 1926
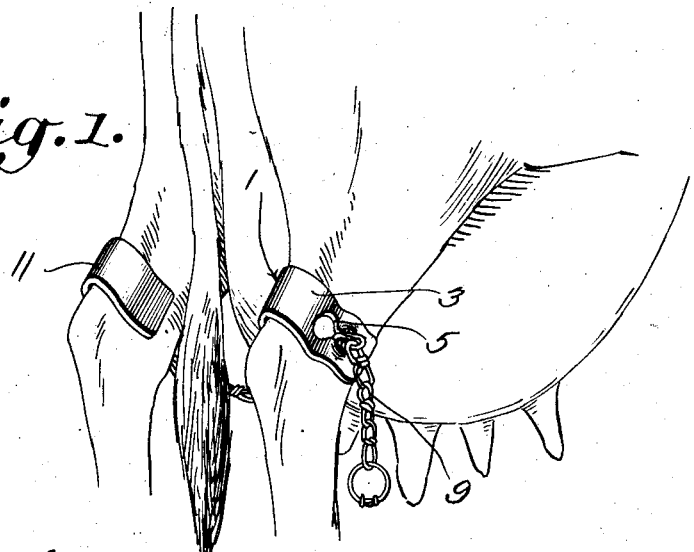
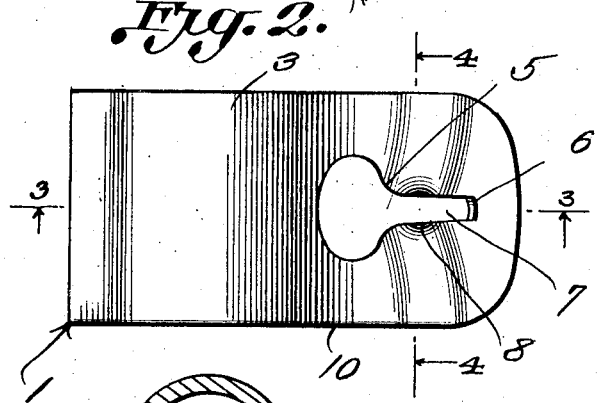
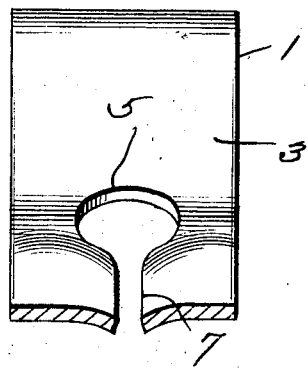
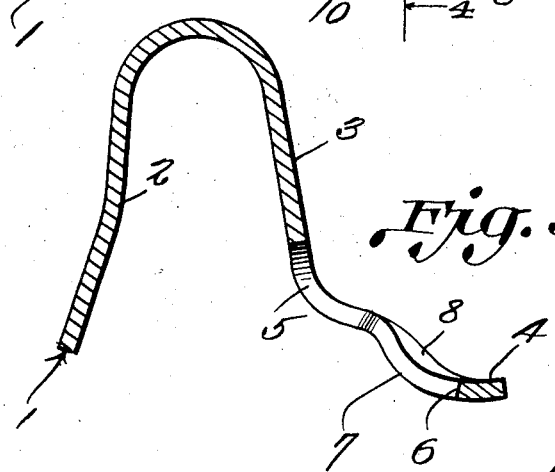
F. M. Ingram
Inventor
By C. A. Snow & Co.
Attorneys Patented June 21, 1927.

1,633,020

UNITED STATES PATENT OFFICE.

FLOYD M. INGRAM, OF SIOUX RAPIDS, IOWA.

COW HOPPLE.

Application filed June 7, 1926. Serial No. 114,253.

This invention aims to provide novel means for assembling a chain adjustably with the leg grip of a cow hopple, and so to construct the leg grip that the chain will not be wedged between one arm of the leg grip and the leg of the cow.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made without in the scope of what is claimed, without departing from the spirit of the invention.

In the drawings:—

Figure 1 shows in perspective, a device constructed in accordance with the invention, in operative position;

Figure 2 is a plan of the leg grip;

Figure 3 is a section on the line 3—3 of Figure 2;

Figure 4 is a section on the line 4—4 of Figure 2.

The device is an animal hopple including a U-shaped leg grip 1, made of metal, and comprising arms 2 and 3, the arm 3 being supplied with an outwardly extended terminal flange 4 which is of sinuous and reversely curved form, as shown in Figure 3, the flange having a keyhole slot 5, the end 6 of the reduced part 7 of the slot 5 extending toward the end of the flange 4, the flange 4 being provided on its outer surface with a depressed seat 8 across which the reduced part 7 of the slot 5 extends. A flexible element having projections, is provided, and the flexible element may be in the form of a chain 9. The flexible element 9 is movable freely through the enlarged part 10 of the keyhole slot 5, the reduced part 7 of the keyhole slot being so narrow that the projections on the flexible element cannot pass therethrough. The seat 8 is so shaped as to receive any of the projections (represented by the ends of the links in the chain), thereby to prevent the flexible element or chain from moving transversely of its length from the reduced part 7 of the keyhole slot 5 into the enlarged part 10 thereof. The seat 9 passes across the forward edges of the legs of a cow, as shown in Figure 1, the grip 1 is mounted on one leg, and any suitable means, such as a U-shaped grip 11, is supplied for connecting one end of the chain 9 to the leg of the cow. The chain may be adjusted lengthwise, readily, through the keyhole slot 5, and when the chain is in the part 7 of the keyhole slot, and when one of the links of the chain is lodged in the seat 8, the chain will remain securely but adjustably in the position to which it has been moved. Owing to the fact that the flange 4 inclines outwardly and laterally, as shown, for instance, in Figure 3, the chain will not be wedged between the flange 4 and the leg of the animal. The keyhole slot 5 is located in the sinuous and reversely curved flange 4, and because the keyhole slot is distorted out of a flat form, it is made the more effective in holding the chain 9.

What is claimed is:—

Means for holding a flexible element, comprising a U-shaped grip embodying arms for engaging the object whereunto the flexible element is to be connected, one of said arms having an outwardly extended terminal flange which is curved reversely and of sinuous form, the flange being provided with a keyhole slot which is distorted out of flat form by the aforesaid curvature of the flange, the flange having a depressed seat across which the reduced part of the keyhole slot extends, the end of the reduced part of the keyhole slot being disposed adjacent to the end of the flange; and a flexible element having projections, the reduced part of the keyhole slot being narrow enough so that the projections cannot pass through it, the seat being so shaped as to receive any of the projections and thereby limit the accidental transverse movement of the flexible element from the reduced part of the keyhole slot into the enlarged part thereof, the flexible element being freely movable in the direction of its length in the enlarged part of the keyhole slot when the flexible element has been forcibly moved transversely thereinto.

In testimony that I claim the foregoing as my own, I have hereto affixed my signature.

FLOYD M. INGRAM.